United States Patent [19]

Yamazaki et al.

[11] 4,446,704
[45] May 8, 1984

[54] AIR CONDITIONING APPARATUS WITH TEMPERATURE REGULATED COOLING

[75] Inventors: Kisuke Yamazaki; Hitoshi Iijima; Fumio Matsuoka, all of Kamakura; Toshizo Nishizawa, Shizuoka, all of Japan

[73] Assignee: Mitsubishi Denki Kabushiki Kaisha, Tokyo, Japan

[21] Appl. No.: 356,007

[22] Filed: Mar. 8, 1982

[30] Foreign Application Priority Data

Apr. 9, 1981 [JP] Japan .................................. 56-53325

[51] Int. Cl.³ .............................................. F25B 41/00
[52] U.S. Cl. ..................................... 62/180; 62/196.3; 62/196.2
[58] Field of Search ............. 62/196 A, 196 C, 196 R, 62/217, 225, 223, 180; 236/1 EA

[56] References Cited

U.S. PATENT DOCUMENTS

| | | | |
|---|---|---|---|
| 3,759,057 | 9/1973 | English et al. | 62/196 C |
| 3,899,897 | 8/1975 | Boerger et al. | 62/196 R |
| 4,357,988 | 11/1982 | Hudson et al. | 236/1 EA |
| 4,364,238 | 12/1982 | Huelle et al. | 62/217 |

Primary Examiner—William E. Wayner
Attorney, Agent, or Firm—Sughrue, Mion, Zinn, Macpeak & Seas

[57] ABSTRACT

The cooling performance of an air conditioning apparatus is controlled by a selective combination of three methods of regulation, in accordance with the required degree of cooling. A first stage of regulation controls the volume of air delivered by a fan 6, a second stage controls the amount of refrigerant flowing through a pressure reduction means 7, and a third stage controls the amount of refrigerant circulating in a compressor feedback circuit 9. Any one of or combination of these three controls may be employed in accordance with the prevailing temperature condition and the required cooling performance.

12 Claims, 6 Drawing Figures

FIG. I
PRIOR ART
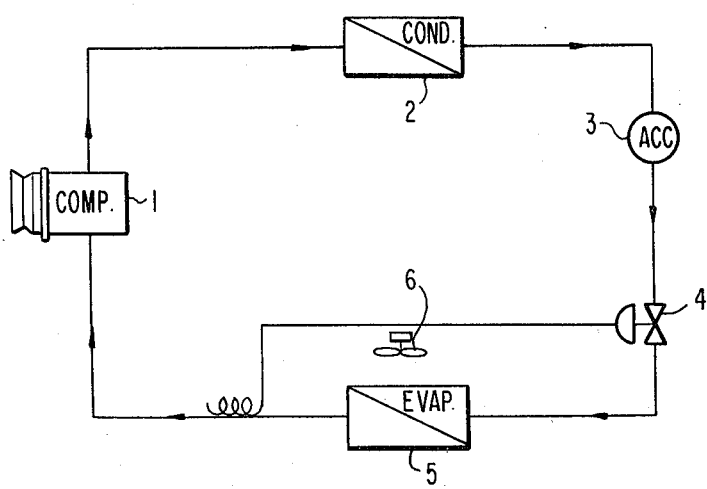
FIG. 2
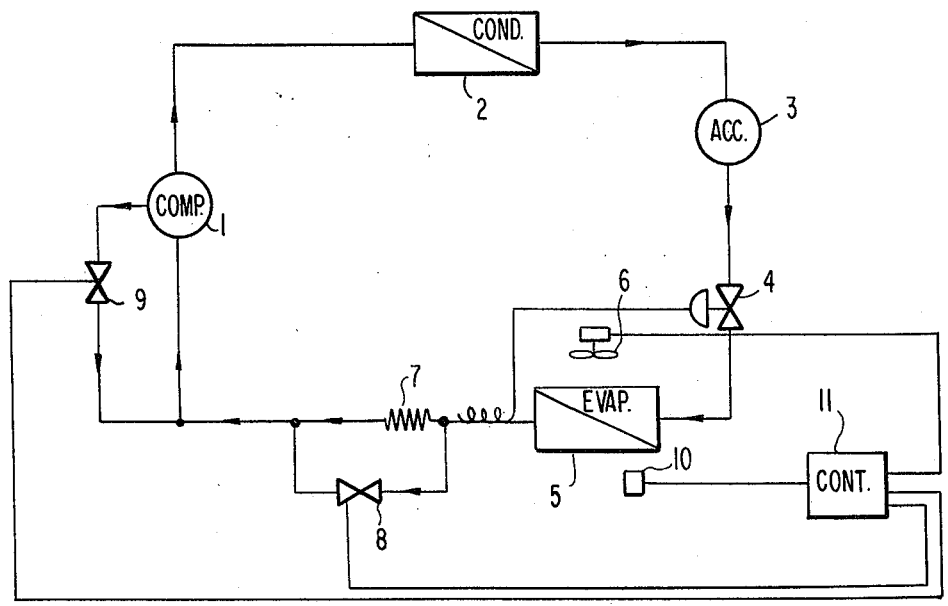

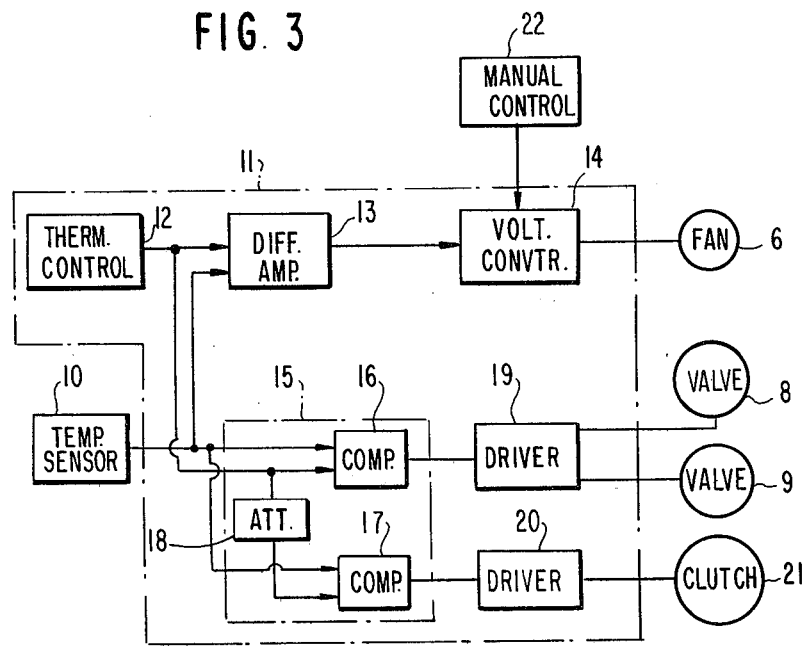
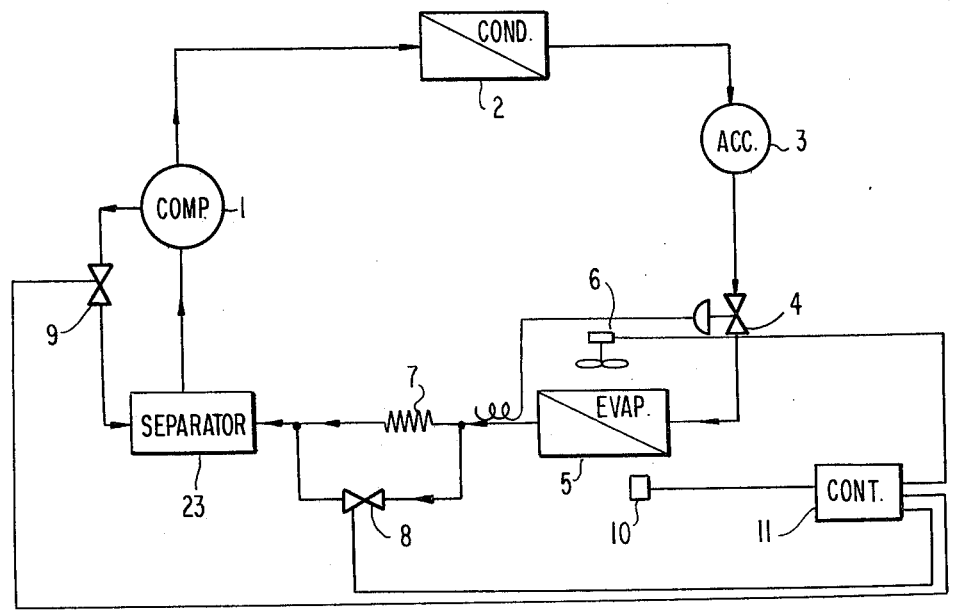

AIR CONDITIONING APPARATUS WITH TEMPERATURE REGULATED COOLING

BACKGROUND OF THE INVENTION

1. Field of the Invention

This invention relates to an air conditioning apparatus whose capacity is adjustable according to the thermal load.

2. Description of the Prior Art

A conventional air conditioning apparatus is shown in FIG. 1, wherein a compressor 1 is driven, for example by a car engine, through a clutch mechanism (not shown) and is connected in series with a condenser 2, an accumulator 3, an expansion valve 4, and an evaporator 5. A fan 6 is disposed near the evaporator for blowing the cooled air to where it is required. A thermal sensor (not shown) is provided to detect the temperature of the air leaving the evaporator 5. The circuit from the compressor 1 to the evaporator forms a main circuit of this air conditioning apparatus. The operation of this conventional apparatus is well known, and an explanation of the heat exchange functions thereof is thus omitted.

As the rotational speed of the drive mechanism (car engine) increases, the rotational speed of the compressor 1 correspondingly increases, and the quantity of the circulating refrigerant flowing through the main circuit per unit of time increases. The work load of the evaporator 5 therefore increases, and the degree of cooling is correspondingly increased. A temperature control is thus provided, including a clutch mechanism which engages or disengages in accordance with a signal from the thermal sensor such that the compressor is caused to operate or stop in accordance with the sensed temperature. In other words, the compressor 1 operates intermittently in accordance with a signal from the thermal sensor.

The temperature of the air passing through the evaporator 5 thus undergoes large rises or falls in accordance with this intermittent operation of the compressor, and these changes in the air temperature are uncomfortable for the cars' occupants. The intermittent operation of the compressor also introduces large deviations in the load imposed on the drive mechanism. In the case of a car, particularly one of relatively small engine displacement and hence torque output, the varying load may have a substantial effect on the rotational speed of the engine, causing it to rise and fall repeatedly in accordance with the intermittent operation of the compressor.

SUMMARY OF THE INVENTION

It is an object of this invention to provide an air conditioning apparatus which can be driven smoothly without undesirable intermittent operation according to the thermal load, with which the room temperature may be kept substantially constant, and which consumes relatively little drive source power.

The foregoing and other objects of this invention have been attained by providing an air conditioning apparatus comprising a compressor for compressing a refrigerant to produce a high-pressure, high temperature gaseous refrigerant, a condensor for condensing the gaseous refrigerant to liquefy it, an expansion valve for expanding the liquid refrigerant, an evaporator for evaporating the expanded liquid refrigerant, and a fan for forcing air to be heat exchanged through the evaporator. A capillary tube controlled by a bypass valve is provided for reducing the pressure of the evaporated refrigerant and returning it to the compressor, as is a feed back circuit having a valve for returning an intermediate pressure level refrigerant from an intermediate point in the compressor to the inlet thereof. Control means are also provided for controlling the amount of refrigerant compressed by the compressor, which means controls the fan speed, the bypass valve and the feedback valve in response to the sensed and desired temperatures.

BRIEF DESCRIPTION OF THE DRAWINGS

FIG. 1 shows a block diagram of a conventional air conditioning apparatus,

FIG. 2 shows a block diagram of an air conditioning apparatus according to one embodiment of this invention, FIG. 3 a block diagram showing one embodiment of the controller shown in FIG. 2, FIG. 6 shows a block diagram of an apparatus according to another embodiment of this invention.

DETAILED DESCRIPTION OF THE PREFERRED EMBODIMENTS

Figure 4:
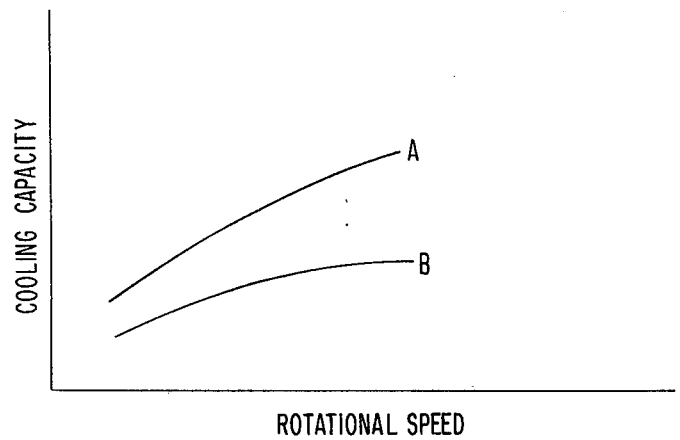
FIG. 4 is a graph showing the relation between cooling capacity and the rotational speed of the compressor.

FIG. 2 shows a first embodiment of this invention wherein reference numerals 1 through 6 designate similar or corresponding parts to those in FIG. 1. In addition, a pressure reducing capillary tube 7 is provided between the outlet side of the evaporator 5 and the inlet side of the compressor 1, and an electromagnetic valve 8 is connected in parallel across the capillary tube 7 to selectively provide a means for the refrigerant to bypass the capillary tube. This valve 8 functions as a control valve as described below. An electromagnetic feedback valve 9 is also provided in a circuit with the compressor 1; the compression circuit and feedback valve 9 return intermediate pressure level refrigerant gas from an intermediate point in the compressor to the inlet thereof. A controller 11 receives a signal from a thermal sensor 10 and sends controlling signals to the fan 6, the bypass valve 8 and the feedback valve 9 in accordance with the signal from the thermal sensor.

In operation, when the full cooling capacity of the system exceeds the amount of cooling required, the cooling capacity of the apparatus is controlled by means of any one or a combination of the valves 8 and 9, and the fan 6. Accordingly, varying degrees of control are provided, wherein the first stage or method is to reduce the amount of air being forced through the evaporator 5 by the fan 6. The next stage or method of control is to reduce the amount of circulating refrigerant by closing the valve 8 so that the gaseous refrigerant is directed through the capillary tube 7 such that its pressure is reduced. A third stage or method is to open the feedback valve 9 whereby a portion of the intermediate pressure level refrigerant is returned to the inlet of the compressor 1, thus regulating the pressurized output of the compressor.

FIG. 3 shows a detailed block diagram of the controller 11, wherein reference numeral 10 designates the thermal sensor which detects the actual temperature T1 inside the car, and reference numeral 12 designates an adjustable thermal control dial with which the driver may set a desired temperature T2. A differential amplifier 13 receives the signals from the sensor 10 and the control dial 12, and generates an amplified output signal in accordance with the difference between the two input signals. A voltage converter 14 receives the amplified signal from the differential amplifier 13 and converts it to a voltage signal to drive the fan 6. A detecting means 15 comprises a first threshold comparator 16 which compares the actual and desired temperature signals, and a second threshold comparator 17 which compares the signal from sensor 10 with the signal from control dial 12 reduced by a predetermined amount by an adjustable attenuator 18. A first driver 19 receives the output signal from the first comparator 16 and actuates the bypass valve 8 and the feedback valve 9. A second driver 20 receives the output signal from the second comparator 17 and actuates a clutch 21 which drives the compressor 1. Finally, reference numeral 22 designates a controller which manually controls the rotational speed of the fan 6.

In operation, assuming that the difference between the actual temperature T1 and the desired temperature T2 is more than 4° C., for example, the first comparator 16 and the second comparator 17 generate outputs which open the bypass valve 8, close the feedback valve 9, and engage the compressor clutch 21. At the same time the differential amplifier 13 generates an output which causes the fan 6 to rotate at full speed. In this condition, the air conditioning apparatus is operated at its maximum cooling capacity.

When the temperature difference drops below 4° C., the first comparator 16 detects this condition and closes the valve 8 and opens the valve 9, and the differential amplifier 13, which may also embody a threshold function, causes the fan 6 to rotate at a lower speed. The second comparator 17, however, does not detect this condition since the difference between its two input signals is maintained greater than that in the first comparator by the attenuator 18. As a result, the gaseous refrigerant from the evaporator 5 is directed through the capillary tube 7 so that its pressure is reduced, and a portion of the intermediate pressure level refrigerant is returned to the inlet of the compressor 1 through the feedback valve 9. Consequently, the cooling performance of the air conditioning apparatus is considerably reduced.

When the temperature falls to the desired temperature T2, the second comparator 17 detects this condition and disengages the clutch 21 which connects the compressor 1 to the car engine. In this condition, the air conditioning apparatus is stopped due to the inoperation of the compressor. The fan is also stopped since no output is produced by the differential amplifier 13, unless an override is provided by the manual controller 22.

As is apparent from the foregoing operation, the air conditioning apparatus can be driven smoothly without undesirable intermittent operation according to the thermal load. It is also possible to change the combination of the three controls or methods of regulation in accordance with the required degree of cooling.

FIG. 4 is a graph showing the relationship between compressor speed, which is proportional to engine speed while the clutch is engaged, and the overall cooling performance of the air conditioning system as a whole. Line A represents an apparatus according to the prior art, and line B represents an apparatus according to the present invention. As may readily be seen, the cooling performance of the prior art system is directly related to compressor speed i.e. engine speed, with the output rising almost linearly with increasing rotational speed. This has meant that the cooling output with the compressor in operation is generally in excess of that required, whereby regulation of the air temperature has to be controlled by switching the compressor on and off with the resulting drawbacks described above. With the various stages of control afforded by the present invention, however, the cooling performance is maintained substantially constant regardless of changes in compressor speed or other variables, as indicated in the graph. Naturally, the cooling performance level can be adjusted up or down to suit user needs or tastes, and the present invention enables the selected level to be maintained substantially constant.

Figure 5:
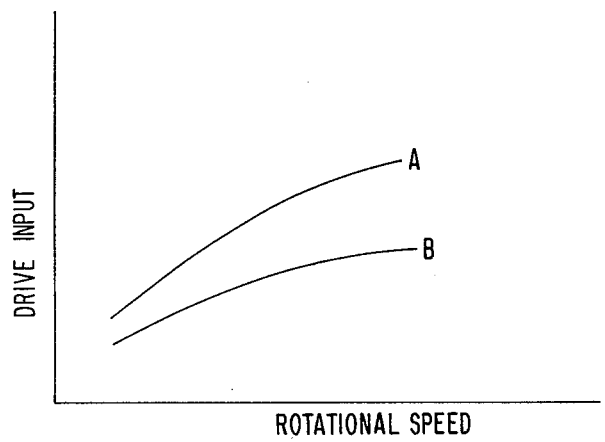
FIG. 5 is a graph showing the relation between the drive input of the compressor and the rotational speed thereof.

FIG. 5 shows the relationship between compressor drive input and compressor speed for the prior art represented by line A, and for the present invention represented by line B. In this instance the drive input represents a proportion of the drive torque produced by the car's engine. The drive input is equivalent to the power needed to accommodate the compressor load, and these parameters can therefore be regarded as being in a substantially fixed proportion. FIG. 5 clearly shows that with the prior art apparatus the compressor load increases almost linearly with the rotational speed of the compressor, while with the apparatus of the present invention the load is maintained relatively constant as it is caused to substantially correspond to the desired cooling performance regardless of engine speed.

In other words, the cooling performance control modes described above enable the compressor to be driven smoothly without undesirable intermittent operation, while providing a substantially constant desired level of cooling performance.

FIG. 6 shows another embodiment of the invention, wherein a refrigerant separator 23 is incorporated at the junction of the main refrigerant circuit and the feedback circuit. Other components and the operation of the cooling system are substantially identical to those in the cooling system shown in FIG. 2. The separator 23 is known per se, and may simply comprise three open ended pipes disposed in the upper portion of a sealed buffer tank or reservoir. Any liquid refrigerant introduced into the tank falls to the bottom region thereof, and only gaseous refrigerant having a ligher specific gravity than the liquid refrigerant is fed into the compressor 1. The separator 23 thus ensures that the refrigerant entering the compressor 1 is completely gaseous and does not contain any liquid phases, thereby preventing pressure surges in the compressor output. The operation of the compressor is thus maintained in a stable condition even if, for whatever reason, some liquid refrigerant flows from the capillary tube 7, the bypass valve 8 or the feedback valve 9.

In the foregoing embodiments an air conditioning apparatus has been described in which the drive mechanism is a car engine, but obviously any other suitable drive source, such as an electric motor, may equally be used with similar operation and effects.

What is claimed is:
1. An air conditioning apparatus comprising:
    (a) a compressor (1) for compressing a refrigerant to produce a high-pressure, high-temperature gaseous refrigerant,
    (b) a condesnor (2) for condensing said gaseous refrigerant to liquefy said refrigerant,

(c) an expansion valve (4) for expanding said liquid refrigerant, (d) an evaporator (5) for evaporating said expanded liquid refrigerant, (e) a fan (6) for forcing air to be heat-exchanged through said evaporator, (f) pressure reduction means provided between said evaporator and compressor, a bypass valve adapted to be open and closed being connected in parallel across said pressure reduction means to selectively provide a bypass passage for said evaporated refrigerant so as to bypass said pressure reduction means to control a pressure reduction rate thereof, a maximum pressure reduction rate being achieved when said bypass valve is closed, (g) a feedback circuit having a feedback valve (9) for returning a portion of an intermediate pressure level refrigerant from an intermediate point in said compressor to the inlet of said compressor, and (h) means (11) for controlling the amount of said refrigerant compressed by said compressor, said control means controlling the amount of refrigerant compressed by the compressor by controlling the fan, the feedback valve, and the bypass valve.

2. An air conditioning apparatus as claimed in claim 1, further comprising a separator 23 receiving said intermediate pressure level refrigerant from said feedback circuit and said evaporated refrigerant from said pressure reduction means for preventing any liquid phase refrigerant from entering the compressor.

3. An air conditioning apparatus as claimed in claims 1 or 2, wherein said compressor is driven by an internal combustion engine.

4. An air conditioning apparatus as claimed in claim 1 wherein said bypass valve comprises an electromagnetic valve.

5. An air conditioning apparatus as claimed in claim 1 wherein said feedback valve comprises an electromagnetic valve.

6. An air conditioning apparatus as claimed in claim 1 wherein said pressure reduction means comprises a capillary tube.

7. An air conditioning apparatus as claimed in claim 1, wherein said control means is responsive to an actual temperature level input supplied by a thermal sensor (10) and a desired temperature level input supplied by a thermal control (12).

8. An air conditioning apparatus as claimed in claim 7, wherein said control means comprises first and second comparators (16, 17) and an attenuator (18), said thermal sensor and said thermal control being connected to said first comparator to transmit signals thereto;

said thermal sensor further being connected to said second comparator to transmit signals thereto, said thermal control being connected to said second comparator via said attenuator to transmit modified signals to said second comparator, said attenuator modifying said signals originating from said thermal control so that a first predetermined temperature differential indicated by signals from said thermal sensor and said thermal control activate only said first comparator and not said second comparator.

9. An air conditioning apparatus as claimed in claim 8, wherein said first comparator controls said bypass valve and said feedback valve, said second comparator controlling a compressor clutch (21), said first comparator keeping said bypass valve open and said feedback valve closed at a second predetermined temperature differential indicated by signals from said thermal sensor and said thermal control, said second predetermined temperature differential being greater than said first predetermined temperature differential, said first comparator closing said bypass valve and opening said feedback valve when said first predetermined temperature differential is indicated.

10. An air conditioning apparatus as claimed in claim 9, wherein said control means further comprises a differential amplifier (13) connected to receive signals from said thermal sensor and said thermal control and further connected to said fan to reduce a rotational speed of said fan when said first predetermined temperature differential is indicated.

11. An air conditioning apparatus as claimed in claim 10, further comprising a controller (22) for manually controlling said rotational speed of said fan.

12. An air conditioning apparatus as claimed in claim 1, wherein substantially all of said refrigerant flows through said bypass valve so as to bypass said pressure reduction means at maximum cooling capacity of said apparatus.

* * * * *